Jan. 26, 1960
H. A. GOTTSCHALL
2,922,977
RECTILINEAR POTENTIOMETER
Filed March 28, 1958
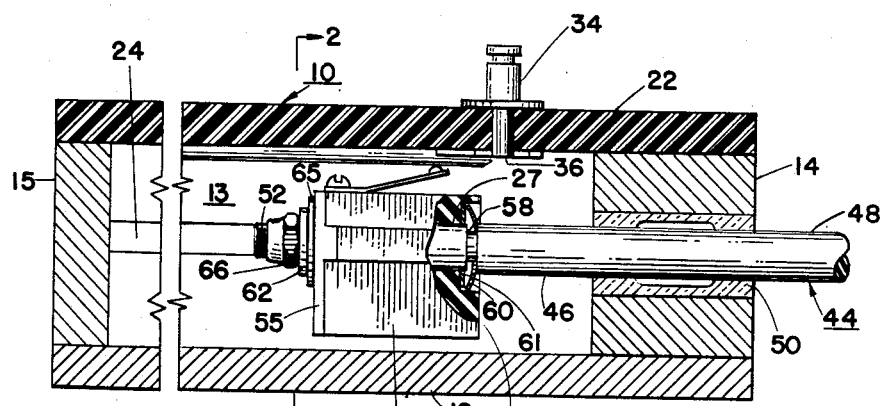
FIG. 1
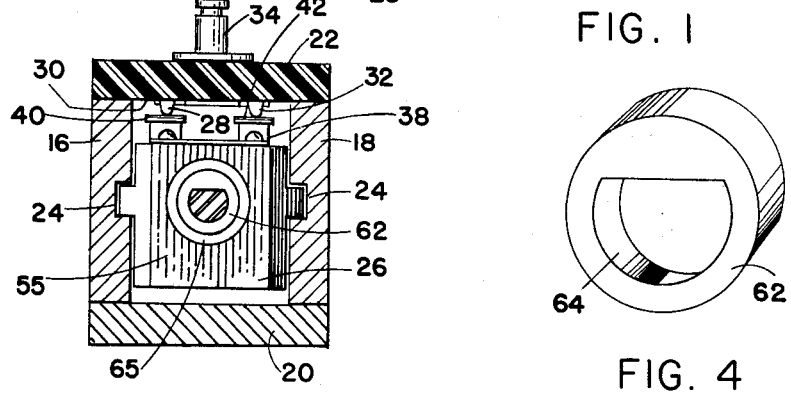
FIG. 2
FIG. 4
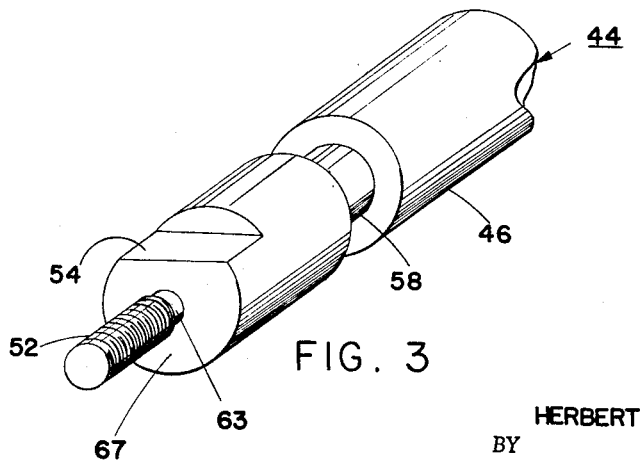
FIG. 3
INVENTOR.
HERBERT A. GOTTSCHALL
BY
Leonard H. King

United States Patent Office 2,922,977
Patented Jan. 26, 1960

2,922,977

RECTILINEAR POTENTIOMETER

Herbert A. Gottschall, Nutley, N.J.

Application March 28, 1958, Serial No. 724,547

8 Claims. (Cl. 338—183)

This invention relates to improved rectilinear potentiometers adapted to withstand extreme vibration, mechanical thrust and gravitational forces, without introducing frictional or mechanical resistance or instrument error resulting from end play between the positioning rod and the contact member carried by this rod.

Special applications exist, notably in aircraft and guided missiles, where potentiometers are subject to sudden thrusts and extreme conditions of vibration, where ordinary means of assembly of the unit would result in a construction inadequate for these extreme conditions. An especially critical component of potentiometers having rectilinear motion and used in such applications, is the linkage between the actuating rod and brush block. The rod may be linked, externally, to movable parts of the aircraft or missile, such as a hydraulic actuator which may subject the rod to both axial and rotational movement.

The necessity for providing for rotational movement of the shaft relative to the brush block prevents permanently fixing the two members in a non-movable relationship. This creates a problem of end play with respect to the axial movement of the actuating rod. In the past this problem has been met by providing the brush block with a bore into which the shaft is fitted. The brush block is then locked onto the shaft by means of a retaining ring such as an E-washer fitted into an annular groove in the shaft. A special problem has been created when such mounting means is employed in potentiometers used in guided missiles, where the acceleration at launching is several hundred times the force of gravity. Under these conditions, the commonly employed retaining ring, if coincidentally oriented with respect to direction of thrust as to open under shock, can become dislodged with the result that potentiometer failure and thereafter failure of the entire missile system can occur.

Where the potentiometer actuating rod is subject to rotation, and only a linear component at right angles to the direction of rotation is to be sensed by the potentiometer, it is necessary to insure that this rotation will not result in loosening or tightening of the connection between rod and brush block. Thus the rod must be rotatably retained within this brush block yet be constrained against axial movement displacing it relative to this block, to avoid errors due to end play. Positioning a retaining ring at the end of the rod near this brush block has not proved to be a feasible solution in applications where extreme thrust is encountered, since the retaining ring tends to snap off. It has therefore been proposed to employ a more reliable component such as a lock nut to resist axial thrust of the shaft. However, this has proved unsatisfactory for missile applications where, under conditions of frequent rotation of the rod, the block will frictionally rotate against the nut, thus loosening it or conversely tightening it so as to prevent rotation of the rod. Either occurrence can cause failure of the potentiometer.

It is therefore an object of the present invention to provide an improved brush block and actuating rod coupling means for a rectilinear potentiometer.

It is a further object of the present invention to provide an improved rectilinear potentiometer adapted to withstand extremes of mechanical shock.

It is yet a further object of the present invention to provide an improved shaft structure, freely rotatable with reference to a brush block, yet adapted to transmit rectilinear motion to such a brush block without end play.

Yet a further object of the present invention is to provide an extremely rugged, simple, easily manufactured rectilinear potentiometer.

These and still other objects and advantages of the present invention will be disclosed in the following description and accompanying drawings, and claims appended thereto.

In the drawings:

Figure 1 is a longitudinal cross-section of a typical device of the present invention.

Figure 2 is a cross-section taken along line 2—2 of Figure 1.

Figure 3 is a perspective view of a portion of the rod shown in Figure 1.

Figure 4 is a perspective showing of one embodiment of a washer employed in the present invention.

Referring now more particularly to the drawings, there is shown in Figure 1 a device of the present invention characterized generally by the numeral 10. An elongated casing 12 formed of metal, defines a longitudinal channel 13 having end walls 14 and 15 and side walls 16, 18 and 20. Elongated closure plate 22 defines a fourth wall for the casing, and when fitted in place the casing has formed therein channel 13.

Grooves 24 are formed longitudinally on the inner surface of side walls 16 and 18 to define guide members. A movable block of electrically non-conductive material 26 is placed within channel 13 and slidably abuts against guide members 24, and is thereby constrained against transverse movement relative to the channel but can move axially therein. Block 26 has an axial bore 27 therethrough. Closure plate 22 has a resistance path 28 formed longitudinally along inner face 30. A conductive path 32 is disposed parallel thereto on this inner face. An appropriate number of terminal connections such as stud 34 are mounted on plate 22 and are provided with rivet portions 36 which make electrical connection with the resistance path and the conductive path, respectively, through suitable conductive members not shown.

Brush member 38, mounted on block 26, is a flexible U-shaped metallic member, the end portions 40 and 42 being formed to define wiping elements. Brush member 38 is positioned upon block 26 so that with closure plate 22 fitted in position, resistance path 28 and conductive path 32 are in abutting relationship to wiping elements 40 and 42 respectively.

To move block 26 longitudinally in the casing channel, rod 44 is disposed within the casing, its inner end 46 passing through bore 27 and its outer end 48 protruding axially from casing 12 through bearing 50 mounted in end wall 14. Rod 44 is rotatably mounted in an oil-filled porous bronze bearing 50 and in bore 27, but is secured to block 26 to prevent axial movement relative thereto by means to be described hereinafter.

As shown in Figure 3, inner end portion 46 of rod 44 is furnished with threaded portion 52. Adjacent to this threaded portion is provided a flat face 54, which may be milled on rod 44. Inner end face 55 of block 26 is positioned proximate to this flat face 54, and outer end face 56 of the block is positioned proximate to annular groove 58 formed on rod 44.

In assembling the unit, a resilient washer 60 is positioned in groove 58. This washer is of the bowed-spring type, and is positioned with its outer edge adapted to abut against a flat washer 61 which in turn abuts block 26, as shown in Figure 1. Washer 61 serves to prevent excessive wear of block 26 by resilient washer 60. It will be noted that washers 60 and 61 are positioned within a cavity formed in outer end face 56 and thereby held captive by the brush block.

A second washer 62, furnished with a D-shaped central aperture 64 (see Figure 4), is fitted over flat 54, the aperture registering rather closely with the configuration of rod 44 at this point, whereby the washer is constrained against rotation relative to the rod. Nut 66 threadedly engages threaded portion 52 of rod 44, and is tightly secured to the rod in this way. A second flat washer 65 which may be of stainless steel 0.003" thick is interposed between washer 62 and face 55 to minimize wear of brush block 26. Washer 62 has a thickness slightly less than the axial dimension of flat 54. A slight undercut 63 is provided at the juncture of the threaded portion 52 and the face 67 of the stepped portion of shaft 44 carrying flat 54. The purpose of the undercut is to make certain that there is no unthreaded region which would prevent the nut 66 from being jammed tightly against face 67. It is essential that nut 66 be accurately positioned against face 67 as it serves to accurately locate washers 62 and 65 and thereby the brush block 26.

It is essential that brush block 26 be accurately located so that wiping elements 40 and 42 are in turn accurately located so as to provide a predetermined correlation between the mechanical position of the shaft and the electrical output of the potentiometer. Block 26 is prevented from axial movement in the direction away from washers 62 and 65 by the thrust action of spring washer 60. Thus the rod cannot move axially relative to block 26, therefore end play between the rod and block 26 is eliminated. While rod 44 can rotate freely relative to the casing, any axial thrust received at end 48 of the rod will be passed accurately to block 26.

It should be particularly noted that rotation of rod 44 will rotate the second washer 62 simultaneously, thus taking up all frictional thrust between block 26 and nut 66. Thus nut 66 remains firmly in place and cannot be dislodged by any rotation of rod 44 relative to brush block 26. There has therefore been provided, in accordance with the present invention, an improved slide rod to be used with rectilinear potentiometers, wherein severe rotational or transverse thrusts will not result in any end play relative to the position of the brush block in the casing nor cause loosening or tightening of fastening means.

A very dependable and accurate rectilinear potentiometer has therefore been provided for by the device of the present invention.

Other methods of keying the washer 62 to rod 44 include the employment of other non-circular shapes for the shaft at the location of the washer. This may be triangular, oval, slotted, or other configuration, in combination with a mating washer having a correspondingly shaped aperture.

It is to be understood that washers may be placed on either side of the apertured washer 62 or omitted entirely without departing from the spirit of the invention.

Various other modifications within the scope of the present invention may be made by those skilled in the art, without, however, departing from the spirit and the broad scope of the invention.

What is claimed is:

1. In a rectilinear potentiometer, including a brush block carried by an actuating shaft, the combination wherein said shaft is provided with a threaded end portion, a radially extending face adjacent to said threaded end portion, a non-circular portion adjacent to said end portion and said radially extending face, means for preventing movement of said brush block past said radially extending face, said means including an apertured washer positioned on said non-circular portion of said shaft, a nut fitted on said end portion acting in cooperation with said apertured washer to retain said brush block on said shaft, and means for maintaining said brush block in abutting relation with said apertured washer, wherein said aperture of said apertured washer is formed with a configuration adapted to meet with said non-circular portion whereby said apertured washer is constrained against rotation relative to said shaft.

2. The device of claim 1, wherein said non-circular shaft portion has a flat formed thereon, and said apertured washer has a D-shaped aperture therein registering with said flat.

3. The device of claim 1, wherein said nut abuts said radially extending face and said apertured washer.

4. A rectilinear potentiometer including an elongated resistance element, a brush block provided with a bore axially therethrough and movable linearly with respect to said resistance element, said brush block having mounted thereon a brush member adapted to slidably engage said resistance element, means to electrically connect said brush member to an external circuit, a shaft adapted to move said brush block linearly, said shaft having a threaded portion, a washer, a nut secured on said threaded portion acting against said washer to retain said brush block on said shaft, resilient means mounted on said shaft urging said block into abutting relationship with said washer, and in combination therewith an apertured washer mounted on said shaft between said nut and said block and means formed on said shaft engaging said apertured washer whereby said apertured washer is rotatable with said shaft.

5. A device as in claim 4, wherein said shaft has a flat formed thereon, the said washer having a D-shaped aperture therein registering with said flat.

6. A device as in claim 4, wherein said shaft is provided with a non-circular portion corresponding to a non-circular aperture of said washer wherein said apertured washer is positioned on said non-circular portion of said shaft and is thereby constrained against rotation relative to said shaft.

7. A potentiometer including a resistance path and a conductive path in parallel, a brush block provided with a bore axially therethrough, said brush block having mounted thereon brush members adapted to slidably engage said resistance path and said conductive path to thereby electrically connect said paths, a shaft extending through said brush block, means supporting said shaft relative to said resistance path and said conductive path and means for securing said brush block to said shaft whereby said shaft is adapted to actuate said brush block so that said brush members traverse said resistance and said conductive paths, wherein said brush block securing means include a threaded portion on said shaft, a nut secured on said threaded portion to retain said brush block on said shaft, resilient means mounted on said shaft urging said block toward said nut, an apertured washer mounted on said shaft between said nut and said block and means formed on said shaft engaging said apertured washer whereby said washer is rotatable with said shaft.

8. A rectilinear potentiometer comprising an elongated hollow casing defining a longitudinal channel, a resistance path disposed longitudinally within said channel, a conductive path disposed longitudinally within said channel, a movable block of electrically non-conductive material constrained against transverse movement relative to said channel, said block having a bore therethrough axial with said channel, means to move said block, means mounted on said block adapted to wipe both said resistance path and said conductive path and to electrically connect said paths, terminal connections formed in said casing in electrical connection with said resistance path and said conductive path, the said movable means for said block comprising a rod axially disposed within said channel and passing through said bore in said block and rotatable therein, one end of said rod protruding externally from one end of said casing and rotatably mounted in said casing at said end, the internal end of said rod protruding from said block through said aperture, wherein said internal end is provided with a threaded terminal portion and a non-circular portion formed on said rod inward and proximate to said threaded portion, a first washer having a non-circular aperture formed therethrough, adapted to mate with said non-circular portion, said washer having an outer diameter greater than that of said aperture in said block and being disposed on said rod at said non-circular portion whereby said first washer is constrained against rotation relative to said rod, a nut threadedly engaging said threaded portion proximate to said first washer, a resilient second washer disposed on said shaft and abutting said block on the side away from said internal end of said rod, whereby said block is constrained between said first and said second washers against axial movement relative to said rod.

References Cited in the file of this patent

UNITED STATES PATENTS

| | | |
|---|---|---|
| 2,703,316 | De Bell | Nov. 15, 1955 |
| 2,751,475 | Gottschall | June 19, 1956 |